United States Patent [19]
Grald et al.

[11] Patent Number: 4,889,280
[45] Date of Patent: Dec. 26, 1989

[54] TEMPERATURE AND HUMIDITY AUCTIONEERING CONTROL

[75] Inventors: Eric W. Grald, Maple Plain; J. Ward MacArthur, Minneapolis, both of Minn.

[73] Assignee: Gas Research Institute, Chicago, Ill.

[21] Appl. No.: 315,280

[22] Filed: Feb. 24, 1989

[51] Int. Cl.$^4$ .............................................. B01F 3/02
[52] U.S. Cl. ............................... 236/44 C; 62/176.6; 73/336.5
[58] Field of Search ..................... 236/44 C, 44 E; 62/176.6; 165/21; 374/142; 73/336.5

[56] References Cited
U.S. PATENT DOCUMENTS

| | | | |
|---|---|---|---|
| 2,267,164 | 12/1941 | Newton | 200/137 |
| 2,949,513 | 8/1960 | Davidson | 200/61.06 |
| 3,080,465 | 3/1963 | Pelishek | 200/138 |
| 4,105,063 | 8/1978 | Bergt | 236/44 C |
| 4,259,565 | 3/1981 | Ogino et al. | 219/216 |
| 4,271,898 | 5/1979 | Freeman et al. | 165/16 |
| 4,350,023 | 9/1982 | Kuwabara et al. | 236/44 C |
| 4,557,317 | 12/1985 | Harmon, Jr. | 236/44 C X |
| 4,649,710 | 3/1987 | Inoue et al. | 62/92 |
| 4,750,545 | 6/1988 | Hile et al. | 165/20 |
| 4,776,179 | 10/1988 | Ta | 236/44 C |

FOREIGN PATENT DOCUMENTS
0179529 11/1982 Japan ............................... 236/44 C Primary Examiner—William Wayner
Attorney, Agent, or Firm—Haugen and Nikolai

[57] ABSTRACT

An acutioneering control adapted to be connected to a thermostat control for temperature modifying apparatus wherein the thermostat control includes a temperature sensor which provides a sensed temperature signal. The auctioneering control includes apparatus for sensing absolute humidity and providing a first output signal corresponding to the sensed absolute humidity; first apparatus for comparing the sensed absolute humidity with a predetermined value wherein the first comparing apparatus receives the first output signal and provides a humidity error signal; apparatus for modifying a predetermined temperature setpoint signal responsive to the humidity error signal; apparatus for limiting the modified temperature and providing a limited temperature setpoint signal; and second apparatus for comparing the limited temperature setpoint signal with the sensed temperature signal. The modifying apparatus may further comprise a third apparatus for comparing the predetermined temperature setpoint value with the humidity error signal so as to provide a modified temperature setpoint signal corresponding to the difference between humidity error signal and the predetermined temperature setpoint value.

6 Claims, 3 Drawing Sheets

TEMPERATURE AND HUMIDITY AUCTIONEERING CONTROL

BACKGROUND OF THE INVENTION

The invention is directed generally to climate control apparatus for controlling indoor climatic environments and, more particularly, to an auctioneering control responsive to temperature and humidity and adapted to be connected to a thermostatic control for temperature modifying apparatus such as an air conditioning unit.

In order to maintain a comfortable indoor environment, particularly in the hot summer months or in warmer climates where air conditioning is employed, it is important to control not only the room temperature of a given indoor structure but also the humidity in the room. In the prior art, U.S. Pat. No. 4,105,063 to Bergt discloses an air conditioning system which maintains the dew point temperature of ambient air in a space below a preselected maximum value by modified use of a heating and cooling apparatus without separate humidity controls. Bergt includes a sensor responsive to absolute moisture content which operates in parallel with the normal thermostat control since he uses a parallel control scheme. Bergt essentially provides a limit switch control which does not adequately address the prevention of short cooling cycles. This over-cycling problem is solved by the present invention which takes cycle times and room temperatures swings into account by always controlling the temperature and humidity through the thermostat, also without requiring a separate humidity control.

SUMMARY OF THE INVENTION

An auctioneering control adapted to be connected to a thermostat control for temperature modifying apparatus wherein the thermostat control includes a temperature sensor which provides a sensed temperature signal is disclosed. The auctioneering control includes means for sensing absolute humidity and providing a first output signal corresponding to the sensed absolute humidity; first means for comparing the sensed absolute humidity with a predetermined value wherein the first comparing means receives the first output signal and provides a humidity error signal; means for modifying a predetermined temperature setpoint signal responsive to the humidity error signal; means for limiting the modified temperature and providing a limited temperature setpoint signal; and second means for comparing the limited temperature setpoint signal with the sensed temperature signal. The modifying means may further comprise a third means for comparing the predetermined temperature setpoint value with the humidity error signal so as to provide a modified temperature setpoint signal corresponding to the difference between humidity error signal and the predetermined temperature setpoint value.

It is one object of the invention to provide an auctioneering control for humidity and temperature in a structure without requiring a separate humidity controller.

It is yet another object of the invention to provide a humidity and temperature control mechanism which provides humidity control information to a thermostat control.

It is one advantage of the invention that the space temperature setpoint is only lowered by the precise amount needed to achieve proper humidity control.

It is yet another advantage of the invention that the setpoint temperature and humidity are not linked through some contrived equation, but are coupled directly through the humidity feedback loop.

Other objects, features and advantages of the invention will become apparent to those skilled in the art through the detailed description of the preferred embodiment, the claims and the drawings herein wherein like numerals refer to like elements.

DESCRIPTION OF THE PREFERRED EMBODIMENT

Figure 1:
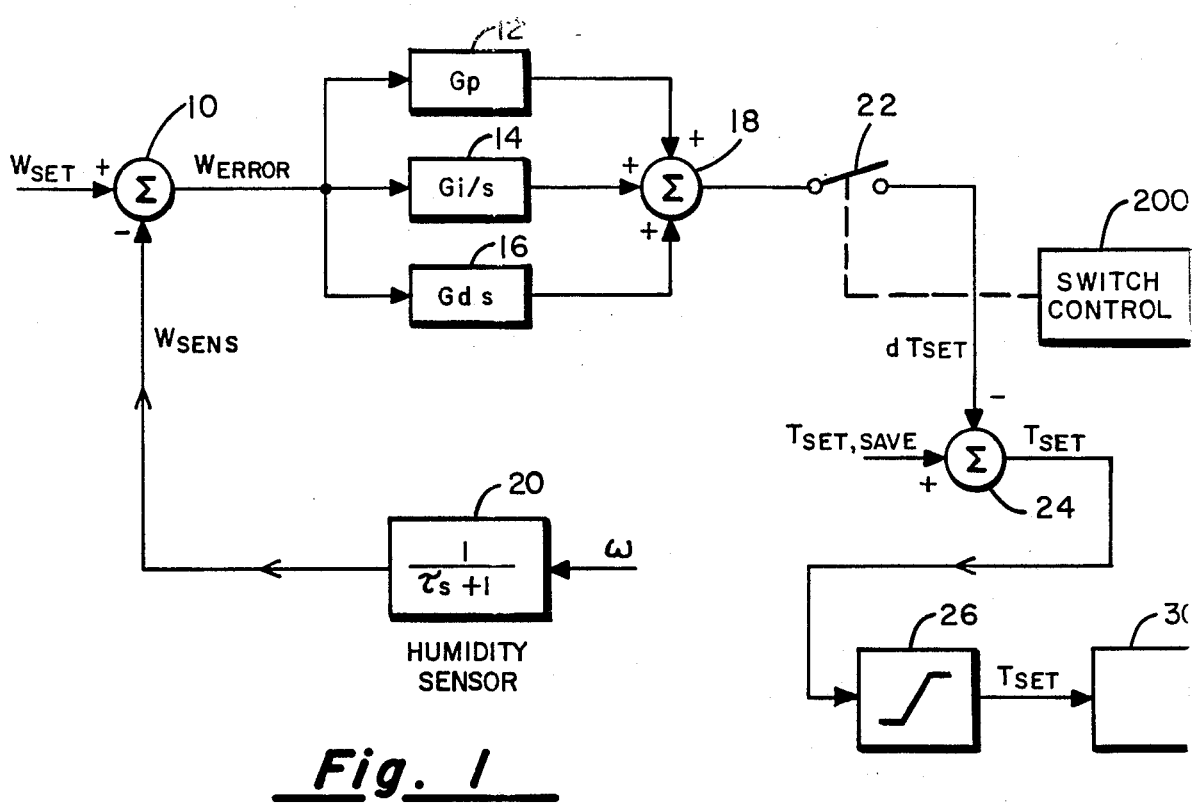
FIG. 1 is a block diagram which schematically shows the humidity sensing and control section of the auctioneering control of the invention.

Referring now to FIG. 1, a block diagram of one embodiment of the humidity control of the invention is shown. A humidity sensor 20 has an output connected to a first comparator 10 which has a comparator output connected to gain blocks 12, 14 and 16 which are all added together at summation point 18, the output of which is switched through switch 22 to a second comparator 24. The output of comparator 24 is then routed to limiter 26 which in turn is connected to the thermostat 30. Switch 22 operates responsively to control signals received from switch control 200. Switch control 200 operates according to the computer algorithm discussed with respect to FIG. 3.

Figure 2:
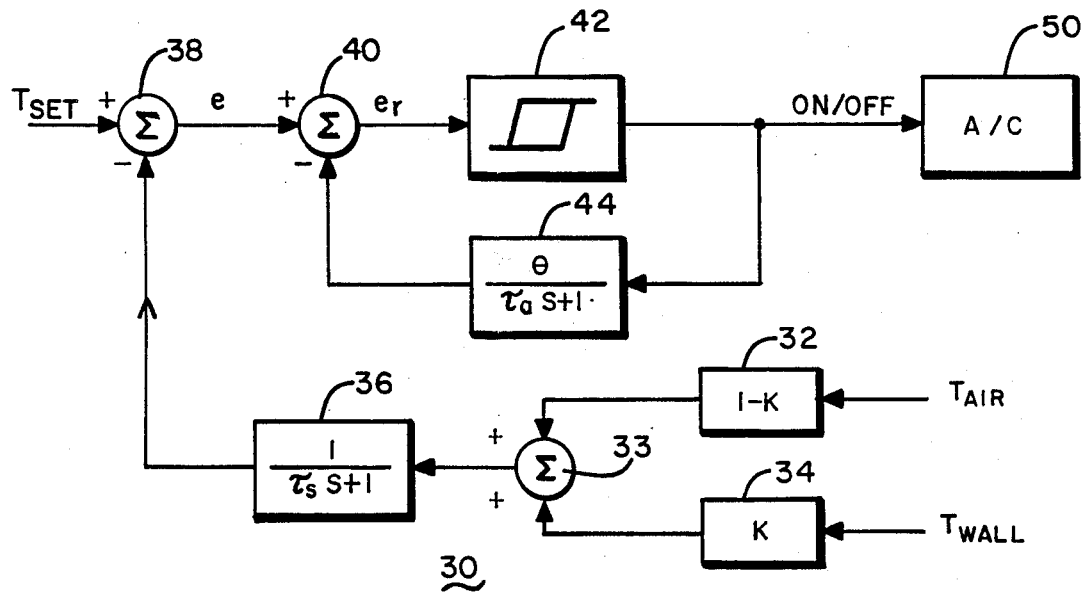
FIG. 2 is a block diagram of a conventional thermostat which receives inputs from the auctioneering control of FIG. 1.

Referring now to FIG. 2, a more detailed block diagram of the thermostat 30 is shown. The thermostat 3 comprises couplings 32 and 34 which are summed at summation point 33 which is further connected at an output to the input of temperature sensor 36. Temperature sensor 36 has an output which is connected to comparator 38, which in turn has an output connected to the input of comparator 40. The thermostat 30 is of a conventional thermostat using a heat anticipator 44 and a hysteresis switch 42 for controlling air conditioning equipment 50. It will be understood by those skilled in the art that air conditioning equipment 50 is only one example of various types of temperature modifying equipment which may be used with the controls of the invention. Other types of equipment would include heat pumps, variable-speed heat pumps, multi-speed heat pumps and other types of cooling and/or heating devices.

Figure 3:
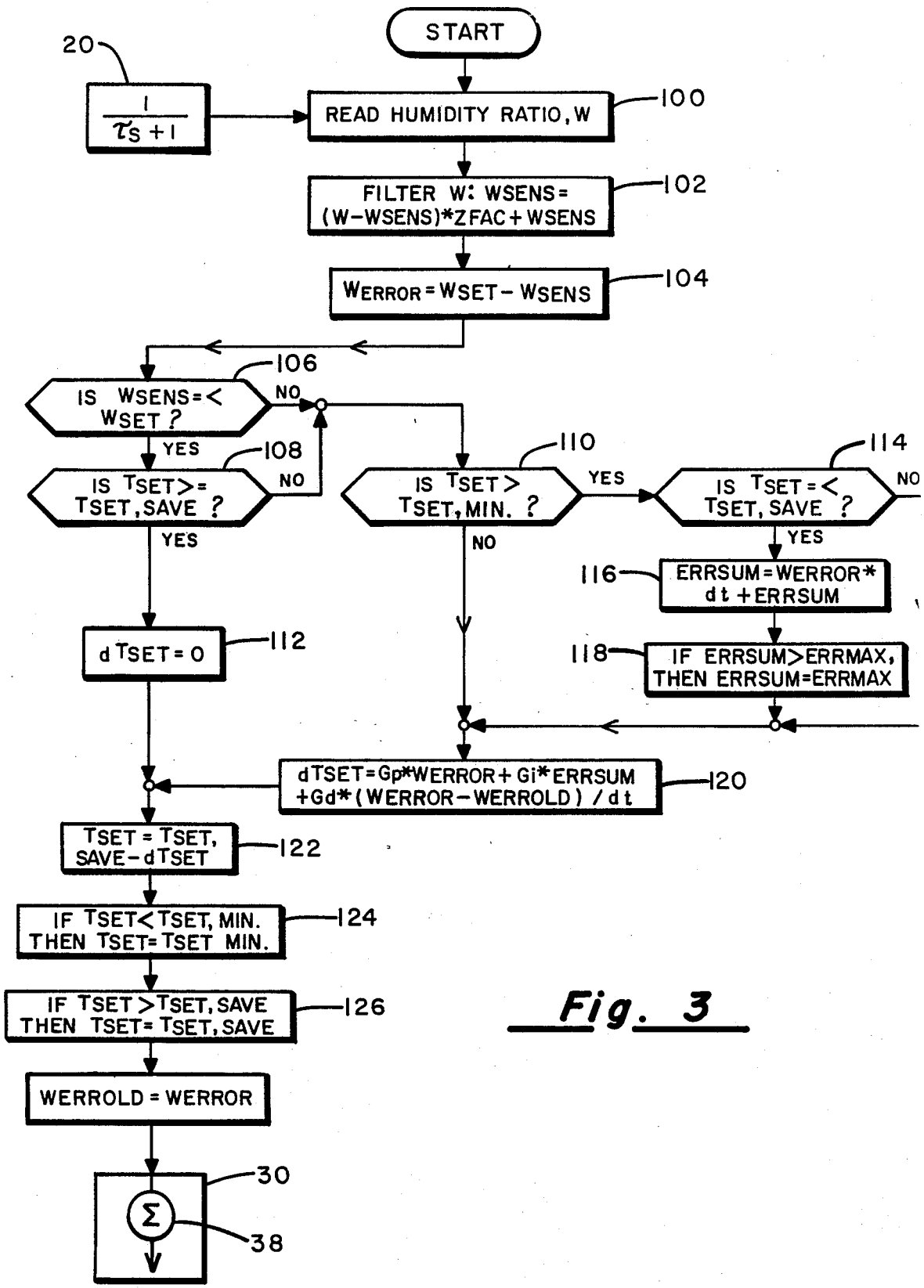
FIG. 3 is a flow chart diagram of the computer algorithm which embodies the principals of the invention.

Having described generally the elements included in one embodiment of the invention, the operational flow of the invention will now be described with reference to FIG. 3 which a flow chart of the computer algorithm employed by the invention. The sequence of events shown in FIG. 3 would typically be repeated several times per minute. One pass through the sequence is hereafter referred to as a "cycle". The auctioneering control first reads the absolute humidity, $\omega$, measured in the space being regulated. The measurement is done by humidity sensor 20 which operates according to the transfer function $1/(\tau_s S+1)$. The humidity ratio, w, is read at step 100. The humidity ratio, w, is then further filtered at step 102 according to the following equation:

$$wsens = (w-wsens)*zfac + wsens \quad (1)$$

In equation (1) above, wsens represents the filtered humidity ratio and, when used on the righthand side of the equation, it represents the filtered humidity ratio from the previous pass through the control loop. The multiplier zfac relates to the filter time constant according to the equation:

$$zfac = 1 - e^{-dt/\tau f} \quad (2)$$

where $\tau_f$ is the sensor time constant and dt is the sampling period (or time between passes through the control loop). The value for zfac will therefore be a number between 0 and 1. Once the new filtered humidity ratio, wsens, is determined, the humidity ratio error is calculated at step 104 as the difference between the filtered humidity ratio and the humidity ratio setpoint, wset, at step 104. The operational flow then moves to step 106 wherein the filtered humidity ratio, wsens, is compared to the humidity ratio setpoint, wset. If the filtered humidity ratio is less than or equal to the humidity ratio setpoint, control is transferred to step 108. Otherwise, control is sent to step 110. Assuming that the decision in step 106 is a "yes", the actual temperature setpoint, Tset is then compared with the desired temperature setpoint, Tset,save. At this point, Tset is equivalent to Tset from the previous cycle. If Tset from the previous cycle is greater than or equal to Tset,save, then control is passed to step 112 where the temperature setpoint change required to control humidity, dTset is set to 0. This is equivalent to opening switch 22 as shown in FIG. 1. Still referring to FIG. 3, if Tset is less than Tset,save, control is passed to block 110 where Tset is compared with Tset,min where Tset,min is equal to the minimum temperature setpoint allowed by the thermostat. If Tset is greater than Tset,min, control is passed to step 114 where Tset is tested against Tset,save at step 114. If Tset is equal to or less than Tset,save, control is then passed to step 116 wherein the integrated error, errsum, of the humidity ratio, which is the difference between the filtered humidity ratio setpoint, werror, is calculated according to the equation:

$$errsum = werror*dt + errsum \quad (3)$$

At step 118, errsum is compared against a maximum allowable and is forced to the maximum allowable error, errmax, if it exceeds that maximum at step 118. Step 120 is entered from either step 110, 114 or 118, depending upon the condition satisfied. At step 120, proportional, integral and derivative gain factors are applied to compute dTset according to the equation:

$$dTset = Gp*werror + Gi*errsum + Gd*(werror-werrold)/dt \quad (4)$$

The gain factors, Gp, Gi, Gd, correspond to the proportional integral and derivative gain factors, respectively. The application of such a proportional-integral-derivative gain factor is well known to those skilled in the art and is often referred to as a "PID" gain block.

Having now determined the value for dTset as either equal to 0, corresponding to switch 22 remaining open, or according to equation (4) above, the operational flow now continues to step 122. In effect the control of switch 22 represented by switch control 200 in FIG. 1 is carried out by operational steps 106 through 120 of the above described operational flow shown in FIG. 3. In step 122, a new value Tset is calculated based upon the difference between Tset,save and dTset. This value is then compared in a limiting function at step 124 to a minimum thermostat setpoint, Tset,min, wherein if Tset is less than Tset,min it is forced to equal Tset,min. The process then continues to step 126 wherein Tset is compared to Tset,save and is equal to Tset,save if Tset is greater than Tset,save. Finally, werrold, which represents the humidity ratio error from the previous cycle, is set equal to werror and the value for Tset is passed to the input of comparator 38 and thermostat 30, which then operates in a conventional manner to treat Tset as if it were a signal representing a pure thermal load. In this way, the invention operates to use the thermostat to control temperature and humidity in an auctioneering manner wherein the humidity setpoint information appears to the thermostat as if it were a thermal parameter. Therefore, no separate humidity controls or units, such as dehumidifiers, are required by the invention. It can be seen from the above description that the process flow through steps 106 and 108 determine whether switch 22 (shown in FIG. 1) is open or closed. An open switch 22 corresponds to a value of zero for dTset. Those skilled in the art will recognize that all of the elements of the invention are readily adaptable to a microprocessor-controlled thermostat or an equivalent computer-based controller. The controls of the invention may also be implemented in analog fashion using either discrete elements, integrated circuits, or large scale integrated circuit devices.

Figure 4:
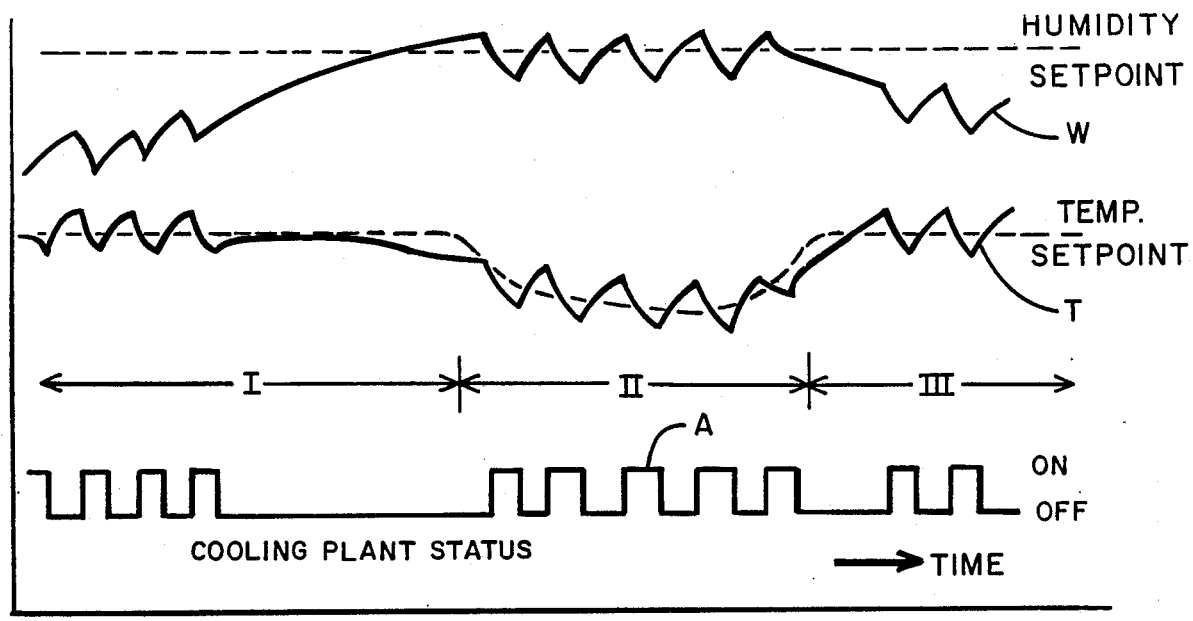
FIG. 4 is a graphical representation illustrating a typical operation of the auctioneering control of the invention.

FIG. 4 shows how the auctioneering controller of the invention would typically transition from temperature control to humidity control and back to temperature control. This Figure shows the response of air temperature T, and humidity ratio, w, versus time. The constant humidity setpoint and the varying temperature setpoint are shown for reference. The on/off status of the cooling plant is also shown by Line A. During period I, the controller is operating like a conventional thermostat, cycling the cooling plant to maintain the air temperature at the desired setpoint. However, the humidity ratio is increasing during this time (due to infiltration of humid outdoor air, cooking, or bathing, for example) and eventually it exceeds the humidity setpoint. Thus, during period II the temperature setpoint is reduced so that the cooling plant operates more frequently and controls the humidity ratio to the desired setpoint. After some time, the humidity load decreases and the temperature setpoint returns to its original value. Conventional thermostat operation begins again in period III.

Having described the operation of the invention, it will be helpful to the understanding of the invention to refer to data generated by a computer simulation of the invention which was accomplished at Honeywell Corporate Systems Development Division, Golden Valley, Minnesota, using an Apollo workstation and a Fortran Program, the source code of which is appended hereto.

Figure 5:
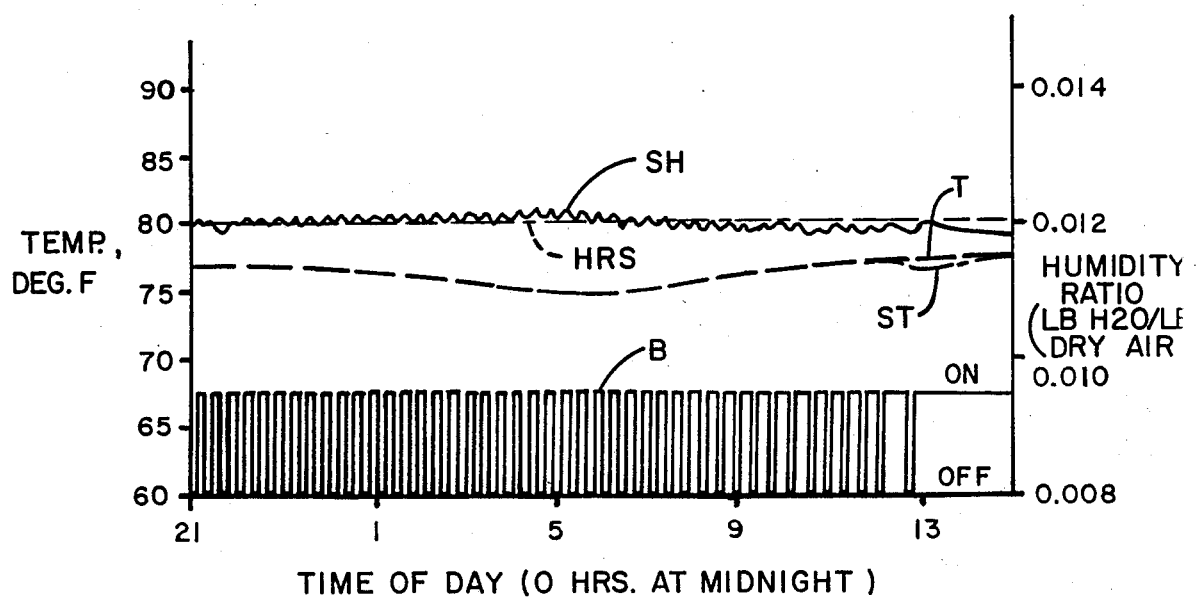
FIG. 5 is a graphical representation of data generated by a simulation of the auctioneering control of the invention.

Referring now to FIG. 5, it can be seen that the time of day in hours is shown on the horizontal axis while the temperature and degrees Fahrenheit and the humidity ratio in pounds of water per pound of dry air appear on the left and right vertical axis, respectively. The performance of the auctioneering control is shown in FIG. 5 for July 17 weather conditions in St. Louis, Missouri using a two-day lead-in period. A detailed computer model of a typical house was used to predict the changes of air temperature and humidity in response to latent and sensible cooling provided by a conventional, single-speed heat pump (also a computer model) which was controlled by the auctioneering algorithm. Actual weather data (ambient temperature and humidity, solar loads, wind speed, etc.) were read from a magnetic tape and used as input data to the computer simulation. The results for an 18-hour time period beginning at 9 p.m. and continuing through 3 p.m. the next day are shown in FIG. 6. In this Figure, the temperature T and humidity ratio SH as sensed by the controller (the sensed temperature and humidity are related to the actual conditions in the space through the sensor time constants) are shown as a function of time. The constant humidity ratio setpoint HRS and the varying temperature setpoint ST are shown for reference. The on/off status of the heat pump is plotted at the bottom of FIG. 5 as Line B. The original temperature setpoint (Tset,save) is 78F. and the humidity setpoint is 0.012 lb water/lb dry air. Due to the high latent load prior to 0 hours (midnight), the indoor humidity ratio has exceeded its setpoint even though the space temperature setpoint is satisfied. Therefore, the controller has depressed the setpoint temperature in order to maintain the indoor humidity ratio at 0.012. The small oscillations in sensed humidity ratio are due to the heat pump cycling on and off. The temperature setpoint reaches a minimum value of 75 F. shortly before 6 a.m. and then begins to increase as the latent load diminishes. By 3 p.m. the setpoint temperature has returned to its original value (Tset,save) because the humidity ratio is now below its setpoint. The control algorithm operates thereafter in a temperature controlling mode like a thermostat.

This invention has been described herein in considerable detail in order to comply with the Patent Statutes and to provide those skilled in the art with the information needed to apply th novel principles and to construct and use such specialized components as are required. However, it is to be understood that the invention ca be carried out by specifically different equipment and devices, and that various modifications, both as to the equipment details and operating procedures, can be accomplished without departing from the scope of the invention itself.

What is claimed is:

1. An auctioneering control adapted to be connected to a thermostat control for temperature modifying apparatus wherein the thermostat control includes a temperature sensor which provides a sensed temperature signal, comprising:
   (a) means for sensing absolute humidity and providing a first output signal corresponding to the sensed absolute humidity;
   (b) first means for comparing the sensed absolute humidity with a predetermined value wherein the first comparing means receives the first output signal and provides a humidity error signal;
   (c) means for modifying a predetermined temperature setpoint signal responsive to the humidity error signal;
   (d) second means for comparing the modified humidity error signal with a predetermined setpoint signal and providing a modified temperature setpoint signal which is equal to the difference;
   (e) means for limiting the modified temperature setpoint signal and providing a limited temperature setpoint signal; and
   (f) third means for comparing the limited temperature setpoint signal with the sensed temperature signal.

2. The apparatus of claim 1 wherein the modifying means further includes means for adding gain to the humidity error signal.

3. The apparatus of claim 2 wherein the gain adding means comprises a summation of proportional, integral and derivative gains applied to the humidity error signal.

4. An auctioneering control adapted to be used in connection with a thermostat connected to air conditioning equipment to control temperature and humidity in a structure comprising:
   (a) means for sensing absolute humidity and providing a first output signal corresponding to the sensed absolute humidity;
   (b) first means for comparing the sensed absolute humidity with a predetermined value wherein the comparing means receives the first output signal and provides a humidity error signal;
   (c) means for adding gain to the humidity error signal and providing a humidity setpoint signal;
   (d) means for switching having first and second terminals wherein the first terminal receives the humidity setpoint signal, wherein the switch operates so as to remain open unless the humidity error signal is less than or equal to zero or the current thermostat setpoint is greater than or equal to the current user-supplied temperature setpoint; and
   (e) second means for comparing connected at a first input to the second switch terminal, at a second input to a predetermined temperature setpoint and at a third input to a signal corresponding to a sensed temperature and further having an output to provide a humidity and temperature error signal.

5. The apparatus of Claim 4 wherein the gain adding means comprises a summation of proportional, integral and derivative gains applied to the humidity error signal.

6. The apparatus of claim 4 further including means for limiting the humidity and temperature error signal connected to the output of the second comparing means.

* * * * *

UNITED STATES PATENT AND TRADEMARK OFFICE
CERTIFICATE OF CORRECTION

PATENT NO.  : 4,889,280

DATED       : December 26, 1989

INVENTOR(S) : Grald, Eric W., et al.

It is certified that error appears in the above-identified patent and that said Letters Patent is hereby corrected as shown below:

Column 3, Line 16, delete the equation "$zfac = 1 - e^{-dt/\tau f}$" and replace it with -- $zfac = 1 - e^{-dt/\tau}$ --.

Signed and Sealed this

Fifteenth Day of January, 1991

Attest:

HARRY F. MANBECK, JR.

Attesting Officer

Commissioner of Patents and Trademarks